United States Patent
Chen et al.

(10) Patent No.: US 9,923,492 B2
(45) Date of Patent: Mar. 20, 2018

(54) ELECTRIC POWER TOOL AND MOTOR CONTROL METHOD THEREOF

(71) Applicant: NANJING CHERVON INDUSTRY CO., LTD., Nanjing (CN)

(72) Inventors: Wu Chen, Nanjing (CN); Fengqin Zhou, Nanjing (CN)

(73) Assignee: Nanjing Chervon Industry Co., Ltd., Nanjing (CN)

(*) Notice: Subject to any disclaimer, the term of this patent is extended or adjusted under 35 U.S.C. 154(b) by 0 days.

(21) Appl. No.: 14/994,422

(22) Filed: Jan. 13, 2016

(65) Prior Publication Data

US 2016/0204674 A1 Jul. 14, 2016

(30) Foreign Application Priority Data

Jan. 14, 2015 (CN) .......................... 2015 1 0018688

(51) Int. Cl.
| | |
|---|---|
| *H02K 7/14* | (2006.01) |
| *H02P 6/08* | (2016.01) |
| *H02P 29/024* | (2016.01) |
| *H02P 29/032* | (2016.01) |

(52) U.S. Cl.
CPC .............. *H02P 6/08* (2013.01); *H02P 29/024* (2013.01); *H02P 29/032* (2016.02)

(58) Field of Classification Search
CPC ....................................................... H02K 7/14
USPC ....................................................... 318/432
See application file for complete search history.

(56) References Cited

U.S. PATENT DOCUMENTS

| | | | | |
|---|---|---|---|---|
| 5,262,704 | A * | 11/1993 | Farr | F25B 49/025 307/80 |
| 5,483,139 | A * | 1/1996 | Welles, II | H02P 25/04 318/782 |
| 6,479,958 | B1 * | 11/2002 | Thompson | B25F 5/00 318/430 |
| 6,611,117 | B1 * | 8/2003 | Hardt | H02P 6/12 318/400.1 |
| 8,018,695 | B2 * | 9/2011 | Serizawa | F02D 41/221 307/24 |
| 8,796,976 | B2 * | 8/2014 | Kusakawa | B25B 21/00 318/280 |
| 9,067,759 | B2 * | 6/2015 | Tracey | B65H 75/4486 |
| 9,216,363 | B2 * | 12/2015 | Sullivan | A63H 27/12 |
| 2004/0056618 | A1 * | 3/2004 | Yoshihara | H02H 7/093 318/400.21 |
| 2006/0081386 | A1 * | 4/2006 | Zhang | B23D 59/001 173/2 |

(Continued)

FOREIGN PATENT DOCUMENTS

JP 2009190118 A * 8/2009

*Primary Examiner* — Kawing Chan
(74) *Attorney, Agent, or Firm* — Greenberg Traurig, LLPC

(57) ABSTRACT

An electric power tool includes a motor, a power supply circuit for supplying power to the motor, and a control device which is able to measure current of the motor and control duty cycle of the power supply circuit. When the measured current of the motor is greater than a predetermined current value, the duty cycle of the power supply circuit is increased to a first predetermined value. If the current of the motor is still greater than the predetermined current value, the duty cycle of the power supply circuit is decreased to a second predetermined value such that the current of the motor is equal to or less than the predetermined current value.

9 Claims, 1 Drawing Sheet

(56) References Cited

U.S. PATENT DOCUMENTS

| | | | | |
|---|---|---|---|---|
| 2007/0283521 | A1* | 12/2007 | Foster | A47L 5/38 15/314 |
| 2008/0315815 | A1* | 12/2008 | Serizawa | F01P 7/08 318/453 |
| 2010/0307782 | A1* | 12/2010 | Iwata | B25F 5/00 173/1 |
| 2013/0002181 | A1* | 1/2013 | Sim | B60T 13/662 318/431 |
| 2013/0193881 | A1* | 8/2013 | Muto | B25F 5/00 318/139 |
| 2014/0117896 | A1* | 5/2014 | Ko | H02P 6/182 318/400.11 |
| 2014/0212161 | A1* | 7/2014 | Cutts | G03G 15/2039 399/70 |
| 2016/0204674 | A1* | 7/2016 | Chen | H02K 7/145 318/432 |

* cited by examiner

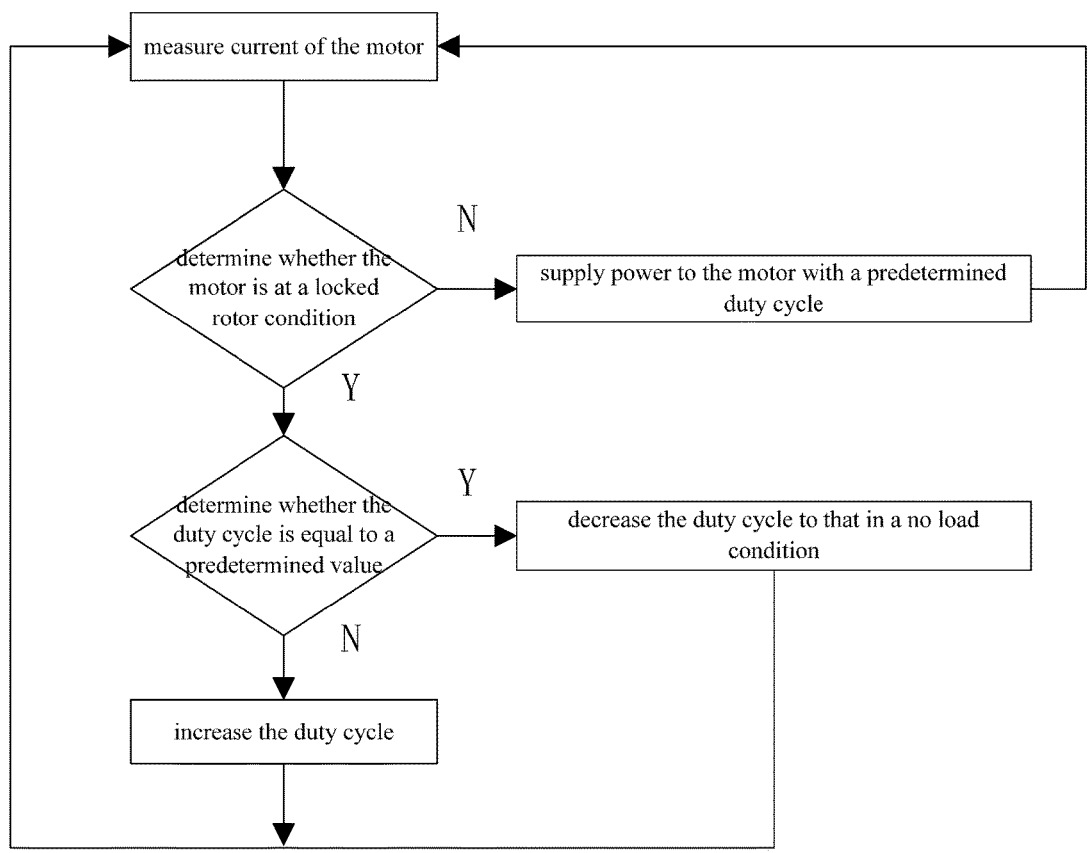

ELECTRIC POWER TOOL AND MOTOR CONTROL METHOD THEREOF

RELATED APPLICATION INFORMATION

This application claims the benefit under 35 U.S.C. § 119(a) of Chinese Patent Application No. CN 201510018688.0, filed on Jan. 14, 2015, the disclosure of which is incorporated herein by reference in its entirety.

FIELD OF THE DISCLOSURE

The present disclosure relates generally to electric power tools and a motor control method thereof.

BACKGROUND OF THE DISCLOSURE

Electric power tools, such as drills, reciprocating saws, jig saws, hedge trimmers and the like, are often in a locked rotor condition during operation. When in a locked rotor condition, the current of the electric power tools increases rapidly. If the electric power tool is in a locked rotor condition for a long time, the motor or elements of a circuit can be burnt. For preventing the motor and circuit from being damaged, a traditional electric power tool cuts off the power supply when a locked rotor condition exists. It is an effective method for avoiding damage to the electric power tool. However, this method requires a user to restart the motor if the user wants to continue the work. Thus, work efficiency is reduced when a locked rotor condition frequently occurs. Also, the restart operation can have a negative impact on motor life.

The statements in this section merely provide background information related to the present disclosure and may not constitute prior art.

SUMMARY

In one aspect of the disclosure, a motor control method includes the process of measuring current flowing through the motor, determining whether the motor is in a locked rotor condition, decreasing a duty cycle of a power supply circuit for supplying power to the motor, if the motor is determined at the locked rotor condition, to be in a no load condition, and increasing the duty cycle of the power supply circuit, if the locked rotor condition of the motor is eliminated, to be maintained at a value where the motor work normally, wherein the whole process is implemented with no need to cut off the power supply and restart the motor.

In another aspect of the disclosure, a control method of a power supply circuit for supplying power to a motor includes the process of:

(a) measuring current flowing through the motor;
(b) determining whether the motor is in a locked rotor condition;
(c) if the motor is not in the locked rotor condition, enabling the power supply circuit to supply power to the motor with a predetermined duty cycle;
(d) if the motor is in the locked rotor condition, determining whether a current duty cycle of the power supply circuit is equal to a first predetermined value;
(e) if the current duty cycle of the power supply circuit is equal to the first predetermined value, decreasing the duty cycle of the power supply circuit to a second predetermined value where the current of the motor is equal to a first current value to eliminate the locked rotor condition of the motor; and
(f) if the current duty cycle of the power supply circuit is not equal to the first predetermined value, increasing the duty cycle of the power supply circuit to be maintained at a value where the motor work normally, wherein the whole process is implemented with no need to cut off the power supply and restart the motor.

In yet another aspect of the disclosure, an electric power tool includes a motor, a power supply circuit for supplying power to the motor, and a control device which is able to measure current of the motor and a control duty cycle of the power supply circuit to implement the process. When the measured current of the motor is greater than a predetermined current value, the duty cycle of the power supply circuit is increased to a first predetermined value. If the current of the motor is still greater than the predetermined current value, the duty cycle of the power supply circuit is decreased to a second predetermined value where the current of the motor is equal to or less than the predetermined current value to eliminate the locked rotor condition of the motor. The duty cycle of the power supply circuit is increased to be maintained at a value where the motor work normally, wherein during the whole process, it is not needed to cut off the power supply and restart the motor.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

FIG. 1 is a flow diagram showing a control method of a power supply circuit of a motor.

The drawing described herein is for illustrative purposes only of a selected embodiment and not all possible implementations, and is not intended to limit the scope of the present disclosure.

DETAILED DESCRIPTION

The following description of the preferred embodiment is merely exemplary in nature and is in no way intended to limit the invention, its application, or uses.

As shown in FIG. 1, the present invention provides a motor control method. The method includes measuring current flowing through the motor, determining whether the motor is in a locked rotor condition, and if the motor is in the locked rotor condition, decreasing the current flowing through the motor. With this arrangement, there is no need to cut off the power supply and restart the motor, and the motor cannot be damaged because of the large current.

Preferably, when the motor is in the locked rotor condition, a duty cycle of a power supply circuit for supplying power to the motor is decreased so as to decrease the current flowing through the motor. When the motor is not in the locked rotor condition, the duty cycle of the power supply circuit is maintained. The current of the motor is controlled effectively by controlling the duty cycle. So the motor cannot be stricken continuously by the large current and the damage of the motor is avoided.

Preferably, it is determined whether the motor is in the locked rotor condition by comparing the measured current of the motor with a predetermined current value. The motor is in the locked rotor condition if the measured current exceeds the predetermined current value, otherwise the motor is not in the locked rotor condition if the measured current does not exceed the predetermined current value.

In other embodiment, it is determined whether the motor is in the locked rotor condition by comparing a measured voltage of the motor with a predetermined voltage value. Alternatively, it is determined whether the motor is in the locked rotor condition by detecting the rotation of the rotor or some construction driven by the rotor by a position detecting device. Specifically, a hall element can be used to detect the rotation of an output shaft driven by the rotor so as to determine whether the motor is in the locked rotor condition.

Preferably, during the performance of the aforementioned motor control method, when the motor is in the locked rotor condition the current of the motor is decreased to a no load current value of the motor. When the motor is not in the locked rotor condition, the duty cycle of the power supply circuit is maintained at 100%. With this arrangement, the motor cannot be damaged due to the motor characteristic that the current increases along with an increase of the load even though in the locked rotor condition.

The aforementioned control method is more applicable to an electric power tools without speed adjustment. As for the electric power tools with speed adjustment, speed stages are controlled by adjusting the duty cycle of the power supply circuit so as to make the duty cycle correspond to the speed stage.

As for the power supply circuit of the motor with different duty cycle, a control method of the power supply circuit of the motor is described as follows, the method includes:
(a) measuring current flowing through the motor;
(b) determining whether the motor is in a locked rotor condition;
(c) if the motor is not in the locked rotor condition, causing the power supply circuit to supply power to the motor with a predetermined duty cycle;
(d) if the motor is in the locked rotor condition, determining whether a current duty cycle of the power supply circuit is equal to a first predetermined value;
(e) if the current duty cycle of the power supply circuit is equal to the first predetermined value, decreasing the duty cycle of the power supply circuit to a second predetermined value so that the current of the motor is equal to a first current value; and
(f) if the current duty cycle of the power supply circuit is not equal to a first predetermined value, increasing the current duty cycle of the power supply circuit.

Preferably, after performing step (e) or (f), the process goes back to step (a) so the method is a closed-loop control method.

Preferably, in step (e), the first current value is equal to the current flowing through the motor while the power supply circuit supplies power to the motor in a no load condition with the duty cycle being equal to the first predetermined value.

Preferably, the first predetermined value is greater than the second predetermined value. In step (f), an increment of the duty cycle is less than the difference between the first and second predetermined value.

When the motor is not at the locked rotor condition, the power supply circuit supplies power with the duty cycle according to the speed stage selected by the user, in which the selected speed stage corresponds to the duty cycle. When the motor is in the locked rotor condition, determining whether the current duty cycle is equal to the first predetermined value. The function of the first predetermined value is to set an upper limit of the duty cycle. Under the premise that the motor cannot be damaged, determining whether increasing the duty cycle to the first predetermined value. During this process, increasing the current of the motor and determining whether the locked rotor condition can be eliminated. If the locked rotor condition can be eliminated, continuing to restore the duty cycle to make it correspond to the speed stage. If the locked rotor condition cannot be eliminated, decreasing the duty cycle so that a smaller current flows through the motor until the locked rotor condition is eliminated.

Specifically, the aforementioned embodiment can be used to determine whether the motor is in the locked rotor condition. Otherwise, in order to increase the ability to run through the locked rotor condition, the predetermined value can be 100%.

In other embodiment, the present invention provides an electric power tool. The electric power tool includes a motor and a power supply circuit for supplying power to the motor. Further, the electric power tool includes a housing for containing the motor and the power supply circuit, a battery pack or a power source module, and a tool driven by the motor.

The electric power tool includes a control device. The control device is able to measure the current of the motor and control the duty cycle of the power supply circuit. When the measured current is greater than a predetermined current value, increasing the duty cycle of the power supply circuit to a first determined value. If the measured current value is still greater than the predetermined current value, decreasing the duty cycle to a second predetermined value so as to make the current of the motor less than the first predetermined current value.

Preferably, the control device includes a field effect transistor and a microcontroller. The field effect transistor is used to turn on/off the power supply circuit. The microcontroller is used to send control signals to the field effect transistor. The duty cycle of the power supply circuit can be controlled by controlling the signals send by the microcontroller.

The electric power tool can perform the aforementioned motor control method and the control method of power supply circuit.

The above illustrates and describes basic principles, main features and advantages of the present invention. Those skilled in the art should appreciate that the above embodiments do not limit the present invention in any form. Technical solutions obtained by equivalent substitution or equivalent variations are intended to fall within the scope of the present invention hereinafter claimed.

What is claimed is:
1. A motor control method for an electric power tool provided with a motor having no speed adjustment, comprising the process of:
during continued operation of the motor:
measuring current flowing through the motor, the current being drawn from a power supply circuit which is operably coupled to the motor and which draws power from a power supply;
determining when the motor is in a locked rotor condition;
decreasing a duty cycle of the power supply circuit while the power supply circuit continues to draw power from the power supply when it is determined that the motor is in the locked rotor condition; and
increasing the duty cycle of the power supply circuit when the locked rotor condition is eliminated,
wherein the steps of decreasing and increasing the duty cycle of the power supply circuit are performed without removing power from the power supply, thereby continuing operation of the motor and without stopping and restarting the motor.

2. The method of claim 1, further comprising comparing the measured current of the motor with a predetermined current value when determining whether the motor is in the locked rotor condition whereby the motor is determined to be in the locked rotor condition if the measured current exceeds the predetermined current value, otherwise the motor is determined to not be in the locked rotor condition if the measured current does not exceed the predetermined current value.

3. The method of claim 1, wherein increasing the duty cycle of the power supply circuit occurs until the duty cycle is at the same value as when the motor is not in the locked rotor condition.

4. A control method for an electric power tool provided with a motor having a speed adjustment comprising the process of:
during continuous operation of the motor:
(a) measuring current flowing through the motor, the current being drawn from a power supply circuit which is coupled to the motor and which draws power from a power supply;
(b) determining whether the motor is in a locked rotor condition;
(c) when it is determined that the motor is not in the locked rotor condition, causing the power supply circuit to supply power to the motor with a predetermined duty cycle;
(d) when it is determined that the motor is in the locked rotor condition, determining whether a current duty cycle of the power supply circuit is equal to a first predetermined value;
(e) when it is determined that the current duty cycle of the power supply circuit is equal to the first predetermined value, decreasing the duty cycle of the power supply circuit to a second predetermined value while the power supply circuit continues to draw power from the power supply wherein the current of the motor is equal to a first current value to thereby eliminate the locked rotor condition of the motor; and
(f) when it is determined that the current duty cycle of the power supply circuit is not equal to the first predetermined value, increasing the duty cycle of the power supply circuit,
wherein steps (e) and (f) are performed during continuous operation of the motor and without removing power to the power supply circuit from the power supply.

5. The method of claim 4, further comprising returning to step (a) after performing step (e).

6. The method of claim 4, further comprising returning to step (a) after performing step (f).

7. The method of claim 4, wherein in step (e), the first current value is equal to the current flowing through the motor while the power supply circuit supplies power to the motor in a no load condition with the duty cycle being equal to the first predetermined value.

8. The method of claim 4, wherein the first predetermined value is greater than the second predetermined value, and in step (f), an decrement of the duty cycle is less than the difference between the first and second predetermined value.

9. An electric power tool, comprising:
a motor;
a power supply circuit coupled to the motor for supplying power to the motor, the power supply circuit drawing power from a power supply during operation of the motor; and
a control device operably coupled to the motor to measure a current draw of the motor and a control duty cycle of the power supply circuit,
wherein when the measured current of the motor is greater than a predetermined current value, the duty cycle of the power supply circuit is increased to a first predetermined value, and when the current of the motor is still greater than the predetermined current value, the duty cycle of the power supply circuit is decreased to a second predetermined value where the current of the motor is equal to or less than the predetermined current value to eliminate the locked rotor condition of the motor, and increasing the duty cycle of the power supply circuit to maintain the duty cycle to the first predetermined value when the locked rotor condition is eliminated, and
wherein the step of decreasing and increasing the duty cycle of the power supply circuit are performed without removing power from the power supply, thereby continuing operation of the motor without stopping and restarting the motor.

* * * * *